Dec. 13, 1927. 1,652,888
C. TER COCK
AUTOMATIC LIGHTING DEVICE FOR MOTOR CARS
Filed March 25, 1927  2 Sheets-Sheet 1
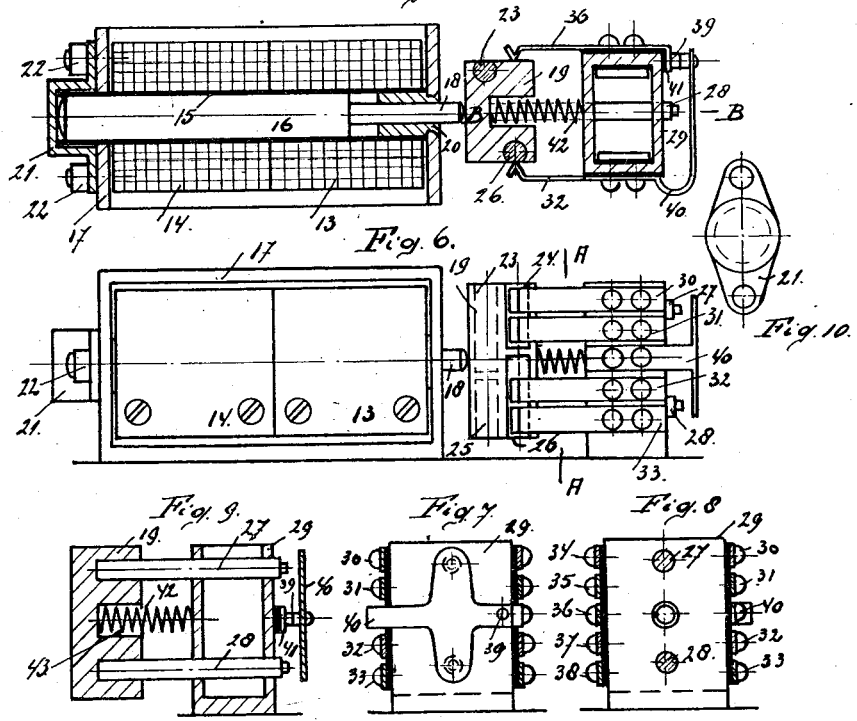
Inventor:
Chris ter Cock Dec. 13, 1927. 1,652,888
C. TER COCK
AUTOMATIC LIGHTING DEVICE FOR MOTOR CARS
Filed March 25, 1927  2 Sheets-Sheet 2
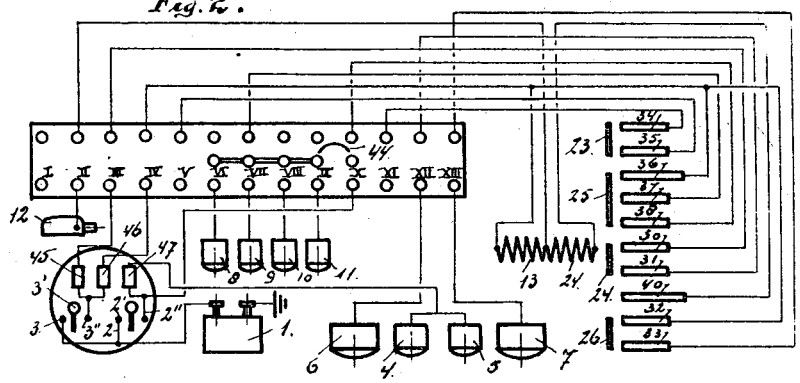
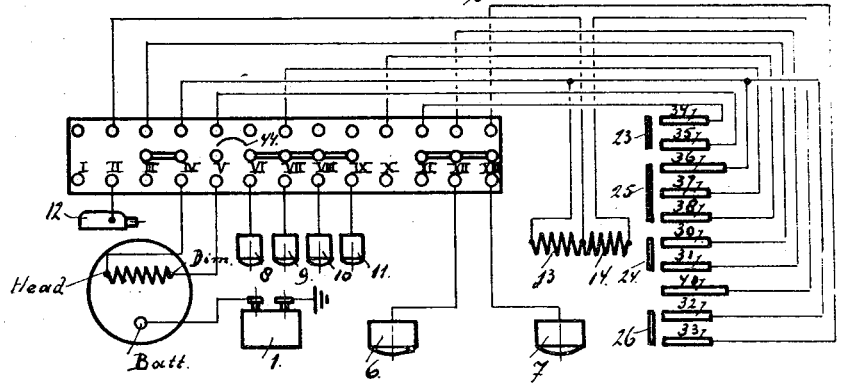
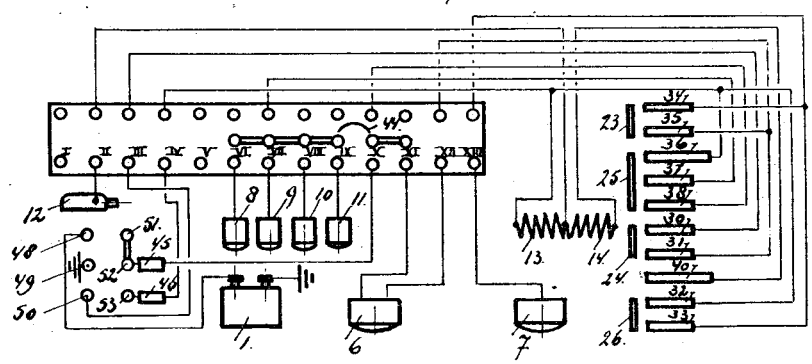

Patented Dec. 13, 1927.

1,652,888

UNITED STATES PATENT OFFICE.

CHRIS TER COCK, OF NAARDEN, NETHERLANDS.

AUTOMATIC LIGHTING DEVICE FOR MOTOR CARS.

Application filed March 25, 1927, Serial No. 178,263, and in the Netherlands March 23, 1926.

It is well known that a chauffeur driving a motor car in the dark on a country road has his attention continually diverted, obliged as he is to switch out the head lights and to switch on the town or passing lights and spotlight and road lights when meeting cars driving in the opposite direction. Besides he has to switch on the head lights again and to switch out the town or passing lights and spotlight and roadlights immediately the car driving in the opposite direction has been passed. These manipulations are very irksome and it is virtually impossible for the chauffeur to have a good survey of the road and to drive properly at the same time. Many accidents have happened on this account.

The object of the present application is to accomplish the switching over from head lights to town or passing lights and auxiliary lights and the reverse way, simply by closing a switch which can be fitted on the steering wheel whereby when actuated the town lights and auxiliary lights remain burning until the switch stops operating, when the head lights are switched on again and the town lights and auxiliary lights are switched off.

The automatic device according to the invention can easily be fitted to existing cars without altering the lighting systems, only one to three short cables being required.

This automatic device can be used for lighting systems with and without fuses. A solenoid with switch-gear changes the lights, which solenoid is energized by closing a switch. The solenoid is provided with two coils, having windings wound in the same direction connected in parallel or windings wound in opposite directions, when the inner terminals are connected together. These coils are coupled in parallel to the head lights, a small switch connecting the windings with the ground or with the negative pole of the battery in case of a double pole system. One of the coils is cut off automatically by means of a special contact device. The plunger of the solenoid moves a contact block, this block being provided with strips on which contact fingers press, some of which are connected to the head lights when the solenoid is out of action and to the town or passing lights and auxiliary lights when the solenoid is operating, or with the head lights connected in series or with dimmed head lights, according to the system. The strips are connected to the contact fingers in such a way, that when the solenoid is switched on the town lights and auxiliary lights start burning and when the solenoid is switched off these lights are extinguished and the head lights are placed in circuit.

The automatic device according to the present invention is shown in the accompanying drawings.

Fig. 1 is a wiring diagram for a lighting system with head and town lights and without fuses.

Fig. 2 is a wiring diagram for a system as used in a well-known lighting system.

Fig. 3 is a wiring diagram for a system as used with a resistance for dimming.

Fig. 4 is a wiring diagram for a system wherein the head lights are switched from parallel to series.

All these diagrams show grounded connections.

Fig. 5 is a horizontal section of the apparatus,

Fig. 6 is a side view of the apparatus.

Fig. 7 is a front view, seen from the right,

Fig. 8 is a section on line A—A of Fig. 6;

Fig. 9 is a section B—B of the switch,

Fig. 10 shows the bumper, serving at the same time as a dust cover.

In Fig. 1 is shown a battery 1 which is grounded and connected in the usual way to the switchboard as fitted on the dashboard, the cables leading to terminals 2 and 3. These terminals are bridged by switches 2′ and 3′ to terminals 2″ and 3″. From these terminals cables lead to the terminal block of the automatic switch 2′ which is connected with X and the latter by a strip with terminal XI, to which are secured the cables of the town lights 4 and 5. Terminal 3″ is connected via terminal III and a strip to terminal IV which leads to the switchgear of the automatic device and from there to terminals XII and XIII, to which head lights 6 and 7 are connected. The auxiliary lights 8, 9, 10 and 11 are attached to the terminals VI, VII, VIII, and IX, which are interconnected by removable strips. The switch 12 mounted on the steering wheel or as most convenient, is connected with terminal II. In case of a double pole system, terminal I can be used to join up the return leads.

The solenoid frame 17 has two coils 13 and 14 which have opposite winding directions when the inner terminals are connected together and, when they have windings in the same direction, they are joined in parallel. In the center of these coils 13 and 14 a very thin hard-drawn tube 15 with plunger 16 is fitted, making a tight fit with the frame 17, thereby offering slight resistance to the lines of force. A brass extension 18 of this plunger bears against the contact block 19. Tube 15 is supported at one end by stop 20, which is riveted or screwed to frame 17 and at the other end to bumper 21, the latter serving at the same time as a dust cover to keep the plunger clean. This bumper is fixed by two nuts 22 and by unscrewing these nuts tube 15 can be pulled out and the coils 13 and 14 removed sideways. The contact block 19, made of insulating material is provided with four contact strips 23, 24, 25, and 26, these being arranged lengthwise two at every side.

Contact block 19 is provided with two rods 27 and 28, which slide in contact holder 29, the center of which coincides with the center of the solenoid. This contact holder is fitted on one side with four finger contacts 30, 31, 32 and 33 and on the other side with contact fingers 34, 35, 36, 37 and 38 and an arcing contact 39. This arcing contact 39 consists of a flexible contact finger 40 and a rigid contact finger 41, the contacts proper as fitted to these fingers being made of a special material to withstand arcing. Contact finger 41 at the same time serves as, contact finger 36 to press on block 19. Sliding rods 27 and 28 with insulated ends push against contact finger 40, thereby breaking contact 39 when nearly at the end of their travel. Spring 42, fitted in a recess 43 of contact block 19, its other end bearing against contact holder 29, is compressed by the travelling of this block and as soon as the solenoid is out of action, pushes back this block and thereby extension piece 18 and plunger 16 to their normal position, when contact fingers 30 and 31 are connected by strip 24 and contact fingers 32 and 33 by contact strip 26.

The connections of this switching arrangement are as follows:

Contact finger 30 is connected to terminal III,

Contact finger 31 is connected to terminal XII,

Contact finger 32 is connected to terminal IV,

Contact finger 33 is connected to terminal XIII,

Contact finger 34 is connected to terminal XI,

Contact finger 35 is connected to terminal V,

Contact finger 36 is connected to terminal IV,

Contact finger 37 is connected to terminal VII,

Contact finger 38 is connected to terminal X,

One end of coil 13 is connected to terminal IV,

The other end of coil 13 is connected to terminal II,

One end of coil 14 is connected to contact 40,

The other end of coil 14 is connected to terminal II.

The terminals 30 and 31 are connected by strip 24.

The terminals 32 and 33 are connected by strip 26,

The terminals 34 and 35 are connected by strip 23,

The terminals 36, 37 and 38 are connected by strip 25.

When using the town or passing lights switch 2' interconnects terminals 2' and 2"; and the following circuit is closed:

Battery, 1, 2, 2", X, XI, 4 and 5, and ground.

When using the head lights, switch 3' interconnects terminals 3 and 3" when the current is as follows:

Battery, 1, 3, 3", III, 30, 31, 12, head lamp, 6, and ground.

The terminals III and IV can be connected by means of a strip, whereby the current at the same time flows from IV, 32, 33, XIII, head lamp, and 7 to ground. The terminals XII and XIII can also be connected by means of a strip.

In case the head lights 6 and 7 are to be switched out and the town or passing lights 4 and 5 and the spot lights and road lights 8, 9, 10 and 11 are to be switched on, by using switch 12 the following circuit is established:

Battery 1, 3, 3", III, IV, 13, II, 12 to earth. This causes the solenoid to be energized when extension piece 18 of plunger 16 presses against contact block 19 and moves it axially. Connection between contact fingers 30 and 31 and strip 24 and between contact fingers 32 and 33 is broken and at the same time contact fingers 34 and 35 press on strip 23 and contact fingers 36, 37 and 38 press on strip 25 with the result that the circuit from fingers 30 and 31 to head light 6 and the circuit from fingers 32 and 33 to head light 7 will be interrupted. The circuit is now established from 34 and 35 to XI and from there to the town or passing lights 4 and 5. The current from finger 36 runs via strip 25 to finger 37 and to terminal VII, which is connected up with the auxiliary lights 8, 9, 10 and 11 and from strip 25 to terminals X and XI.

Before plunger 16 contacts with stop 20 the insulated ends of the rods 27 and 28 have broken contact 40, which being connected to the coil 14, the latter stops operating, this coil only being used as an operating coil and thereby diminishing consumption of current. Coil 13, which serves as a retaining coil and uses much less current remains active for holding plunger 16 against the pressure of the compressed spring 42 to stop 20. The spark which occurs when switching off coil 14 is caught by contact 39, which is made to withstand any damage. As long as the head lights 6 and 7 remain switched on the automatic device does not use any current, while during the time the town or passing lights and the auxiliary lights are burning a very small amount of current is used, through retaining coil 13. By stopping operation of switch 12, the current in coil 13 will be interrupted and spring 42 pushes back the control block 19, which again will move extension piece 18 and plunger 16 to its normal position, whereby the town lights and auxiliary lights are extinguished and the head lights 6 and 7 are switched on again.

An auxiliary switch 44 can be used for connecting terminals IX and X, so that in case of damage to the automatic switch, the auxiliary lights can be lighted together with the town lights, for which the switches of the switchboard on the dashboard are to be used. By switching off the head lights, by opening switch 3' and by closing switch 2' the following circuit will be established:

1, 2, 2", X. XI, townlights 4 and 5, ground and over 44 to IX, VIII, VII, VI, auxiliary lights, 11, 10, 9, 8, and ground.

By stopping operation of switch 44, and not touching the switchboard, the small lights 4 and 5 can be used only, when passing through a town. In case the head lights are desired, switch 2' has to be opened and switch 3' brought into action. As to lighting-systems where the head lights are protected separately, and the town or passing lights together, when switching on the head lights, the circuit is established as follows: (see Fig. 2).

1, 3, 3", to the fuses 45 and 46. From 45 the current runs to III and from 46 to IV. From III to contact fingers 30, 24, 31, XII, lamp 6, ground. From IV to contact fingers 32, 26, 33, XIII, lamp, 7 and ground.

The blowing of a fuse has no influence on the other head light, the circuits for the head lights 6 and 7 remaining separated and therefore the strip between terminals III and IV should not be used.

In case the town or passing lights are required, by using switch 2' the following is established:

Battery 1, 2, 2", fuse 47 which remains connected to the town or passing lights, and ground. For this system therefore the cables of the town lights are not brought to the terminal block of the automatic switch.

When using switch 12 the head lights are interrupted and the town or passing lights, the spotlights and the roadlights are switched on. The circuit will be as follows:

1, 3, 3', 3", 46, IV, 36, 25, 37, 38 and from 37 to VII, 8, 9, 10, 11 ground and from 38 to X which terminal is connected to terminal 2", to fuse 47, lamps 4 and 5, ground, and whereby the town lights, by using the automatic device, remain protected by the fuse 17.

The auxiliary switch is fitted between terminals IX and X.

Regarding the lighting systems using a resistance for dimming the head lights, thereby lowering the voltage and where no town lights are used, the circuit when switching on the head lights, is as follows:

"Battery", head IV, III—IV, 32, 26, 33, 13, 7 ground and from III, 30, XII, 6 to ground. The terminals XI, XII, and XIII are interconnected.

When using the position "dim" of the switchboard, the following circuit is established:

1, "dim", "head" and further as above. In using switch 12 the circuit is as follows:

1, "battery", "head", "dim" and also to IV. From IV to 36, 25, 37, VII, auxiliary lights, 8, 9, 10, 11 ground and also from "head" through the resistance to "dim", V, 35, 23, 34, XI, XII, XIII, lights 6 and 7, and ground.

The auxiliary switch 44 is fitted between V and VI. With position "dim" of the switchboard and by closing the auxiliary switch, the following circuit is established:

1, "battery", "dim", "head" and also to terminal V. from "head" to IV—III and from IV to 32, 26, 33, XIII, lamp 7, ground and from III to 30, 24, 31, XII, lamp 6 to ground. Consequently the head lights are burning with reduced voltage.

From "dim" to V, 44, VI, VII, VIII, IX, lamps 8, 9, 10, 11, ground. The auxiliary lights have normal voltage.

The lighting systems switching over from the head lights connected in parallel to the head lights in series, turning out the town lights, and where each head light is protected by a fuse, the following circuit is established with lights in parallel:

1, terminal 48 which is connected to terminals 51 and 52. Fuse 45, terminals X and XI, which are interconnected, head light 6, XII, 31, 24, 30, III, terminal 50. The latter is connected up to terminal 49 and this one is grounded.

The other circuit is:

52, 53, 46, IV, 32, 26, 33, XIII, head light 7, and ground.

For using the head lights in series the following is established:

1, 48 being connected up to 51, 52, 45, X, XI, headlight 6, XII, 31, 24, 30, III, 50, 53, 46, IV, 32, 26, 33, 13, head lights 7, and ground.

With the head lights in parallel and by using switch 12, even though the lamps remain in parallel with regard to the switchboard on the dashboard, it is possible to place the lights in series whereby the following circuit will be established:

1, 48, 51, 52, 45, X, XI, head light 6, XII, 31, 35, 23, 34, XIII, head light 7, and ground.

Also 52, 53, 46, IV, 36, 25, 37, VII, VI, VIII, IX, auxiliary lights 8, 9, 10, 11, and ground. These lights have the normal voltage.

The auxiliary switch 44 is fitted between terminals IX and X. For head lights in series and by using this switch, the circuit is as follows:

Terminal X, 44, IX, VIII, VII, VI, lamps, 11, 10, 9, 8, and ground. These auxiliary lights have therefore normal voltage.

I claim as my invention:

1. A lighting system comprising head, passing and road lights; a source; means comprising a relay to selectively connect either the head lights or both the passing and road lights to the source; manually operable means for energizing the relay; means for connecting the passing lights to the source regardless of the position of the relay; and an auxiliary switch to connect the road lights to the passing lights.

2. A lighting system comprising main and auxiliary lights; a source; a relay having two actuating coils and a plurality of sets of contacts, means comprising certain of said contacts for connecting the main lights to the source in one position of the relay, and means comprising other of said contacts for connecting the auxiliary lights to the source in the other position of the relay; manually operable means to connect the coils to the source to actuate the relay; and additional contacts carried by the relay to break the circuit of one of the coils as the relay approaches the end of its actuating stroke.

In testimony whereof I affix my signature.

CHRIS TER COCK.